7/21/87 XR 4,680,857

United States Patent [19]

Lintott

[11] Patent Number: 4,680,857

[45] Date of Patent: Jul. 21, 1987

[54] WINDING METHOD

[75] Inventor: Edward R. Lintott, London, England

[73] Assignee: Lucas Industries public limited company, Birmingham, England

[21] Appl. No.: 863,195

[22] Filed: May 14, 1986

[30] Foreign Application Priority Data

Jun. 18, 1985 [GB] United Kingdom ................ 8515351

[51] Int. Cl.4 ............................................ H02K 15/08

[52] U.S. Cl. .................................... 29/596; 242/7.03; 310/14

[58] Field of Search ................ 29/596, 605; 242/7.03; 310/12-14, 35

[56] References Cited

U.S. PATENT DOCUMENTS 4,439,698 3/1984 Chen ................................ 310/14 X

*Primary Examiner*—Carl E. Hall

*Attorney, Agent, or Firm*—Balogh, Osann, Kramer, Dvorak, Genova & Traub

[57] ABSTRACT

A winding method for winding the parallel connected coils of the stator structure of an electromagnetic device, the individual coils being connected in parallel to a pair of supply terminals. On completion of one coil the wire is led into the adjacent groove to be occupied by the next coil to be wound and one turn is wound in the groove before the wire is led to a supply terminal.

2 Claims, 3 Drawing Figures

WINDING METHOD

This invention relates a method of winding the coils of the stator structure of an electromagnetic device of the kind in which the stator structure is of cylindrical form and defines a plurality of axially spaced pole pieces, adjacent pole pieces defining grooves therebetween, the coils being located in the grooves respectively and in use being supplied with electric current by way of a pair of supply terminals at one end of the stator structure.

A device of the aforesaid kind is described in British specification No. 2036453. As described the coils are connected in series and the winding of all the coils can be achieved using a single length of wire. In this case since the electrical connections are to be made to terminals at one end of the stator structure longitudinal slots are formed in the pole pieces, the slots accommodating the interconnections between adjacent coils. The coils are wound in turn with the winding direction of one coil being opposite to that of the adjacent coil or coils so that adjacent pole pieces assume opposite magnetic polarity when the coils are supplied with electric current.

In some instances it is required that the coils should be connected in parallel. In this case the furthest coil from the terminals will be wound first followed by the adjacent coil and so on. The aforesaid slots in the pole pieces will extend into a slot formed in the base walls of the groove and extending the length of the stator structure, the slot being wide enough or deep enough to accommodate the end connections of the coils which in this case can be wound in the same or in the opposite direction, providing the end turns are connected correctly to the terminals.

When completing the winding of one coil the wire must be laid into the slot and the problem exists of maintaining the tension in the wire while connection is made to the appropriate terminal.

The object of the invention is to provide a method of winding the coils of a stator structure of the kind specified in a simple and convenient form.

According to the invention a method of winding the coils of a stator structure of the kind specified comprises laying the wire forming the lead into a coil in a slot extending from said one end of the stator structure, winding the coil in the groove furthest from said one end of the stator structure, taking the lead out portion of the wire forming the completed coil into the next adjacent groove and winding at least one turn before returning the wire along the slot to said one end of the stator structure, and repeating the process until all the coils have been wound.

An example of a winding method in accordance with the invention will now be described with reference to the accompanying drawings in which.

Figure 1:
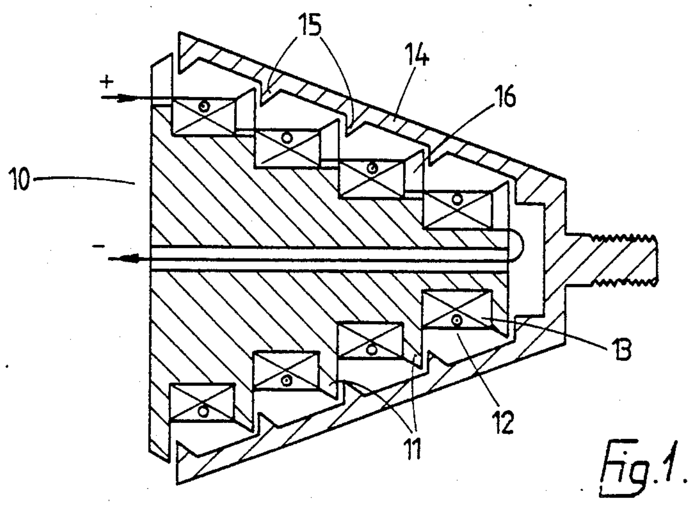
FIG. 1 is sectional side elevation of an electromagnetic device to which the invention may be applied.

Referring to FIG. 1 of the drawings the electromagnetic device comprises a stator structure 10 which is provided with a plurality of axially spaced circumferential pole pieces 11. In the particular example, there are five pole pieces and adjacent pole pieces define grooves 12 therebetween which grooves are occupied by coils 13 respectively. The device also includes an armature 14 which defines internal projections 15 which are presented to the sides of the pole faces 11 respectively and both the armature and stator structure are of tapering form. In the example shown in FIG. 1, the coils 12 are connected in series with the connections being disposed at the wider end of the stator structure. One connection leads directly into the adjacent coil 13 and the connection from the farthest coil is taken through an axial bore formed in the stator structure. The connections between adjacent coils are located in slots 16 respectively which are formed in the pole pieces. With the arrangement shown in FIG. 1 it is a simple màtter, since the windings are connected in series, to wind the coils from a single length of wire. In the case where it is desired that the coils should be connected in parallel, the slots 16 are deepened and extend into a longitudinal slot 17 extending substantially the length of the stator structure and which extends into the base walls of the grooves 12.

Figure 3:
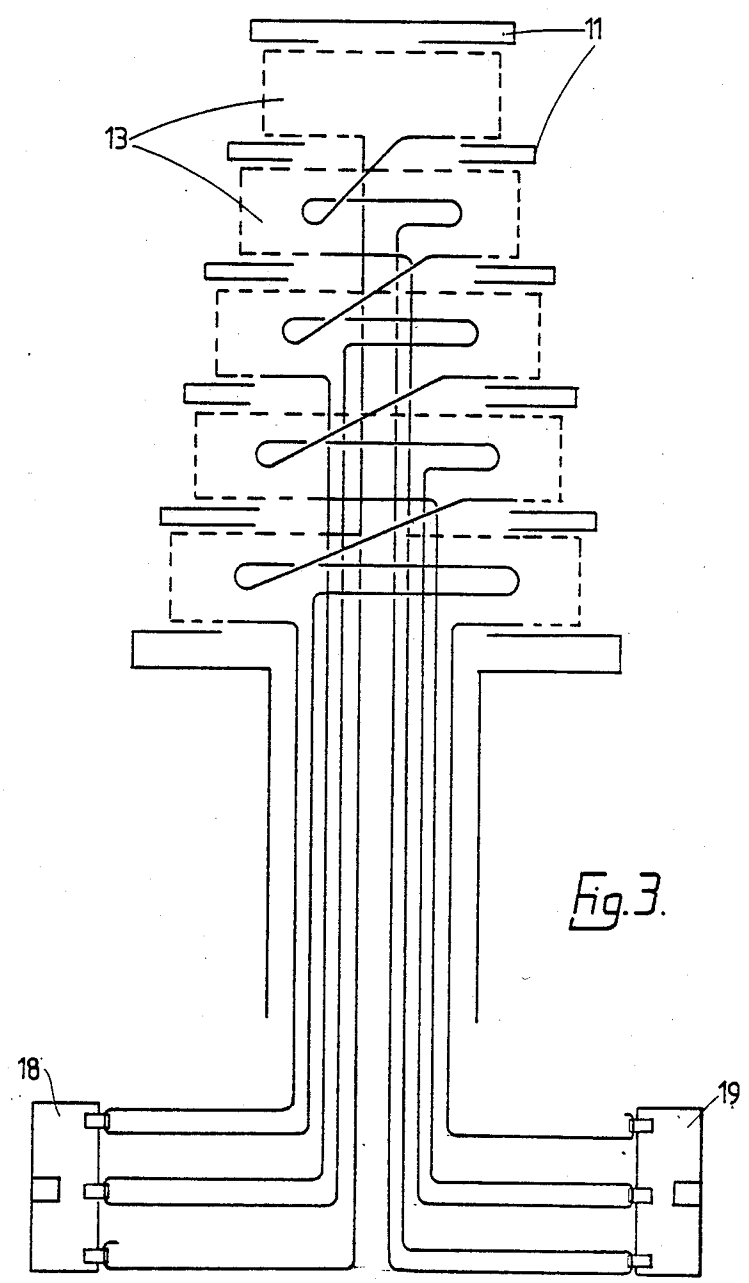
FIG. 3 shows a winding diagram.

Referring now to FIG. 3 of the drawings the ends of the coils are to be connected respectively to terminals 18, 19 mounted in electrically insulated relationship, at the wider end of the stator structure. As previously mentioned, the coils are to be connected in parallel. The first coil which is wound is that which is furthest from the wider end of the stator structure and as shown in FIG. 3 the wire forming the coil is connected to the terminal 18 and is then led along the slot 17 into the furthest groove 12 so that the coil 13 can be wound. When the required number of turns have been wound the wire is led through the slot 16 in the adjacent pole piece and down to the base wall of the adjacent groove. Winding then continues in the same direction until at least one turn has been wound in the adjacent groove and following this the wire is returned along the slot 17 and is connected to the terminal 19. The process is then repeated for each coil in turn, the coils being wound in the same direction. Clearly when the coil at or nearest the wider end of the stator structure has been wound there is no adjacent slot for the one turn and in this case the wire is connected directly to the appropriate terminal in this case terminal 19.

When the terminals are connected to a source of supply the current flow in the coils is such that adjacent pole pieces assume opposite magnetic polarity and the flux extending between the pole pieces and the projections 15, exerts an axial force between the stator structure and the armature.

Figure 2:
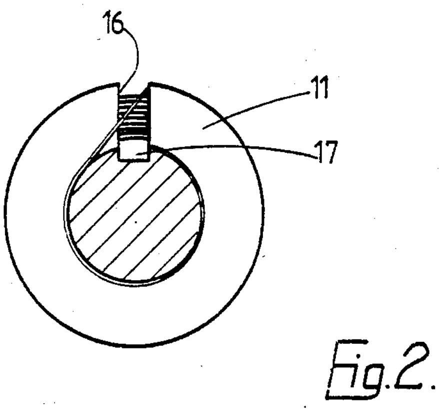
FIG. 2 is an end view of a pole piece of the example in FIG. 1.

The winding of a single turn in the adjacent groove following completion of the winding of a coil serves to secure the tension in the coil which has just been wound. FIG. 2 illustrates the passage of the wire through the slot 16. Since the direction of winding the coils is the same, the direction of electric current flow in the coils in the grooves is opposite in adjacent grooves. However, since the single turn of wire which is wound in the adjacent groove is wound in the same direction, the current therein will tend to produce a magnetic flux acting in the opposite direction to that of the coil in that groove. Since however only a single turn of wire is involved the reduction of magnetic flux is very small.

It is possible to wind the holding turn in the opposite direction but if this is done the portion of the wire leading from the outer surface of the preceding coil to the base wall of the adjacent groove lies against the pole face and therefore occupies winding space. Moreover, the direction of winding has to be reversed although of course in this case the magnetic flux generated by the single turn together with the coil in that groove are additive.

I claim:

1. A method of winding the coils of a stator structure of an electromagnetic device of the kind in which the stator structure is of cylindrical form and defines a plurality of axially spaced pole pieces, adjacent pole pieces defining grooves therebetween, the coils being located in the grooves respectively and in use being supplied with electric current by way of a pain of coil end connections connected to a pair of supply terminals at one end of the stator structure, the method comprising laying the wire forming a first connections to a coil in a slot extending from said one end of the stator structure, winding the coil in the groove furthest from said one end of the stator structure, taking the lead out portion of the wire forming the completed coil into the next adjacent groove and winding at least one turn before returning the wire along the slot, thereby forming a second connection, to said one end of the stator structure, and repeating the above steps until all the grooves have coils wound therein.

2. A method according to claim 1 in which said one turn is wound in the same direction as the previously completed coil.

* * * * *